US005736827A

United States Patent [19]

Dohnal et al.

[11] Patent Number: 5,736,827

[45] Date of Patent: Apr. 7, 1998

[54] MOTOR DRIVEN STEP SWITCH

[75] Inventors: Dieter Dohnal, Lappersdorf; Peter Okanik; Manfred Stadelmayer, both of Regensburg, all of Germany

[73] Assignee: Maschinenfabrik Reinhausen GmbH, Regensburg, Germany

[21] Appl. No.: 313,204

[22] PCT Filed: Apr. 7, 1993

[86] PCT No.: PCT/EP93/00863

§ 371 Date: Sep. 27, 1994

§ 102(e) Date: Sep. 27, 1994

[87] PCT Pub. No.: WO93/22717

PCT Pub. Date: Nov. 11, 1993

[30] Foreign Application Priority Data

Apr. 30, 1992 [DE] Germany .......................... 42 14 431.0

[51] Int. Cl.[6] .......................................... H02P 7/20

[52] U.S. Cl. .......................... 318/696; 318/557; 307/143

[58] Field of Search .................................. 318/696, 473, 318/807, 798, 685; 361/24, 88, 86, 71; 307/41, 139, 38, 40, 141–143; 323/234

[56] References Cited

U.S. PATENT DOCUMENTS

| | | | |
|---|---|---|---|
| 3,553,483 | 1/1971 | Jarvis | 307/141 |
| 4,162,424 | 7/1979 | Zillgitt et al. | 307/10.8 |
| 4,300,158 | 11/1981 | MorgenFruh et al. | 358/80 |
| 4,845,594 | 7/1989 | Wilkerson | 361/71 |

OTHER PUBLICATIONS

"Motor Drive Units MA7& MA9", Maschinenfabric Reihhausen, Sep. 94.

*Primary Examiner*—John W. Cabeca
*Attorney, Agent, or Firm*—Herbert Dubno; Andrew Wilford

[57] ABSTRACT

A motor-driven step switch for step transformers includes a drive motor connected to the step switch, display, input, and control units, a controller for actuating the drive unit in accordance with rotation direction, an information unit which obtains and transmits the step position and which is connected with the controller which delivers commands for controlling the drive motor and a switching operation, and an electrical connection between the controller and display, input, and control units. In accordance with this invention the information unit has a sensor for determining the absolute value of the actual position of the step switch, a nonvolatile memory unit for storing the position of the step switches with a range of step positions, and a unit for determining an end position of the step switch. It also has a programmable unit for storing specific data about the step switches to be actuated, an electronic unit for converting the stored data into serial form, and another electronic unit for controlling and monitoring the switching operation. The electrical connection with the controller and other display, input, and control units is formed by a single serial data line.

12 Claims, 3 Drawing Sheets

MOTOR DRIVEN STEP SWITCH

CROSS REFERENCE TO RELATED APPLICATIONS

This application is the US national phase of PCT application PCT/EP93/00863 filed 7 Apr., 1993 with a claim to the priority of German application P 42 14 431.0 filed 30 Apr., 1992.

FIELD OF THE INVENTION

The invention relates to a motor-driven step switch. More particularly this invention concerns such a step switch which includes a drive motor connected to the step switch and a controller for actuating the drive unit in accordance with rotation direction as well as an information unit which recognizes and transmits the switch position and which is electrically connected with a controller which produces the signals for activating the control of the drive motor.

BACKGROUND OF THE INVENTION

Such motor-driven step switches are known from German open application 2,410,641.

The motor drives of these step switches are constituted as a drive and an information unit; the main part of the drive unit is a drive motor—normally a polyphase asynchronous motor—which is switched by a protective controller in accordance with rotation direction and which on reaching the respective set-point voltage step of the step switch is cut off from the line and short circuited. In addition a hand crank is provided for manually actuating the step switch when necessary. The information unit has means for determining the actual position of the step switch, for example a tachometer or position switches for each possible step, which determines the rotation and rotation direction of the drive shaft.

To actuate the step switch, that is for controlling the protective or other controller in the known step switches the motor drive is connected via electrical lines with a controller. In this known controller a signal for actuating the controller is produced depending on any deviation between the desired and actual voltage on the transformer being operated as well as on further criteria, e.g. when controlling several step transformers on a common bus in parallel.

The disadvantage of these known step switches is that the motor drive has a multiplicity of electrical connections which must all be connected via separate electrical lines with the respective controller. These connections are necessary because quite a bit of information, for example for the actual determination of switch position, rotation rate, and rotation direction of the drive shaft and so on, must be produced in the motor drive by electrical or electromechanical means often at a large remove from the controller. Further conductors are necessary in order to make possible for example optical position indicators; finally further lines are needed to send the commands back from the controller to the motor drive which converts them into switching movements of the step switch.

This disadvantage is particularly grave when one takes into account that the locations in which the equipment is located and in which other indicators, e.g. banks of lamps, are provided is often more than 50m from the step transformer and thus from the respective step switch and its motor drive and that a group of up to 50 individual conductors must span this distance.

In fact this last-mentioned problem does not exist with so-called autotransformers such as known from British patent 2,109,960 where the controller is mounted on the transformer, but with such step transformers there remains the disadvantage of a multiplicity of electrical connections between the controller and the motor drive.

OBJECTS OF THE INVENTION

It is therefore an object of the present invention to provide an improved motor-driven step switch.

SUMMARY OF THE INVENTION

This object is achieved according to the invention in a motor-driven step switch for step transformers which includes a drive motor connected to the step switch, display, input, and control means, a controller for actuating the drive unit in accordance with rotation direction, an information unit which obtains and transmits the step position and which is connected with the controller which delivers commands for controlling the drive motor and a switching operation, and an electrical connection between the controller and display, input, and control means. In accordance with this invention the information unit has a sensor for determining the absolute value of the actual position of the step switch, nonvolatile memory means for storing the position of the step switches with a range of step positions, and means for determining an end position of the step switch. It also has programmable means for storing specific data about the step switches to be actuated, electronic means for converting the stored data into serial form, and further electronic means for controlling and monitoring the switching operation. The electrical connection with the controller and other display, input, and control means is formed by a single serial data line.

The step switch according to the invention has the considerable advantage that the information about the various step positions, its actual position inside a range of step positions, whether it has reached the upper or lower end position, and all further information about the motor drive, e.g. the selected type of operation (remote/local), tripping of the motor control switch, pause of the drive motor, and the like is serially encoded, that is stored, and is sent over only a single serial data line to the standard controller where it is used to produce control commands which are then sent back on the same data line to the step switch.

The sensor that determines the absolute value of the actual position of the step switch ensures that, unlike incremental rotary-position detectors, after recovering from a previous power failure the position detecting remains operational.

A particular advantage is the provision of further additional interfaces to the motor drive. By means of an additional serial connection it is possible, for example by means of a connected diagnosing device such as a lap-top computer, to read out information such as the number of switchings per step and the total current per step which is for example useful for monitoring and servicing functions. It is also possible to provide additional means connected to this inteface which are comparable to a "log recorder" which archives the serial-line data flowing between the controller and the motor drive for the last six or twelve hours so as to be able to go back in the case of a breakdown. Such means can even be provided right in the motor drive.

BRIEF DESCRIPTION OF THE DRAWING

The invention is more closely described in the following with reference to drawings.

There is shown in.

SPECIFIC DESCRIPTION

Figure 1:
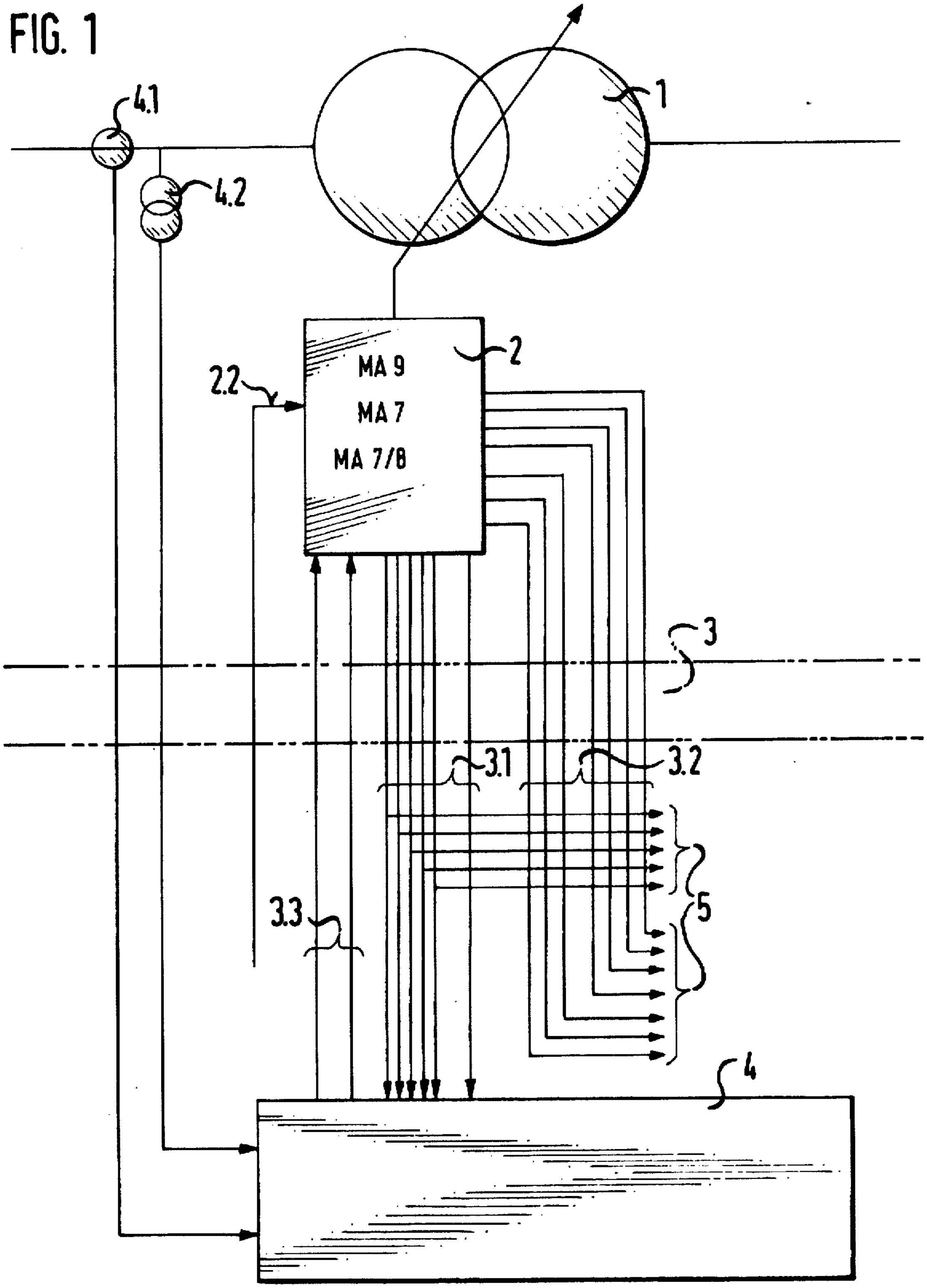
FIG. 1 a schematic representation of a known motor-driven step switch according to the prior art in connection with a controller.

In the known motor-driven step switches as shown in FIG. 1 the information obtained by tachometers, signalling contacts, or the like about the actual switching condition at the step transformer 1 is produced in an information unit of the motor drive 2, is fed to a terminal, and thence goes via a transmission path 3 of a known controller 4 and other devices 5. The transmission path 3 is formed as a plurality of individual electrical connections 3.1 to the controller 4; in addition the transmission path has further conductors 3.2 which lead independently of the controller 4 to further devices such as separate outputting devices or displays or are used with separate unillustrated means for synchronous control.

In the controller 4 the information obtained via the transmission path 3 and the I- (current) and U-(voltage) values which are obtained by means of the current-converter 4.1 and the voltage converter 4.2 are handled directly in the controller 4 to produce corresponding commands that are fed over further conductors 3.3 back to the motor drive 2 where they effect a stepping of the step switch on the step transformer 1 upward or downward. As described, the transmission path 3 is formed according to the prior art of a plurality of individual connections which are arranged in the different functional groups 3.1, 3.2, and 3.3.

Figure 2:
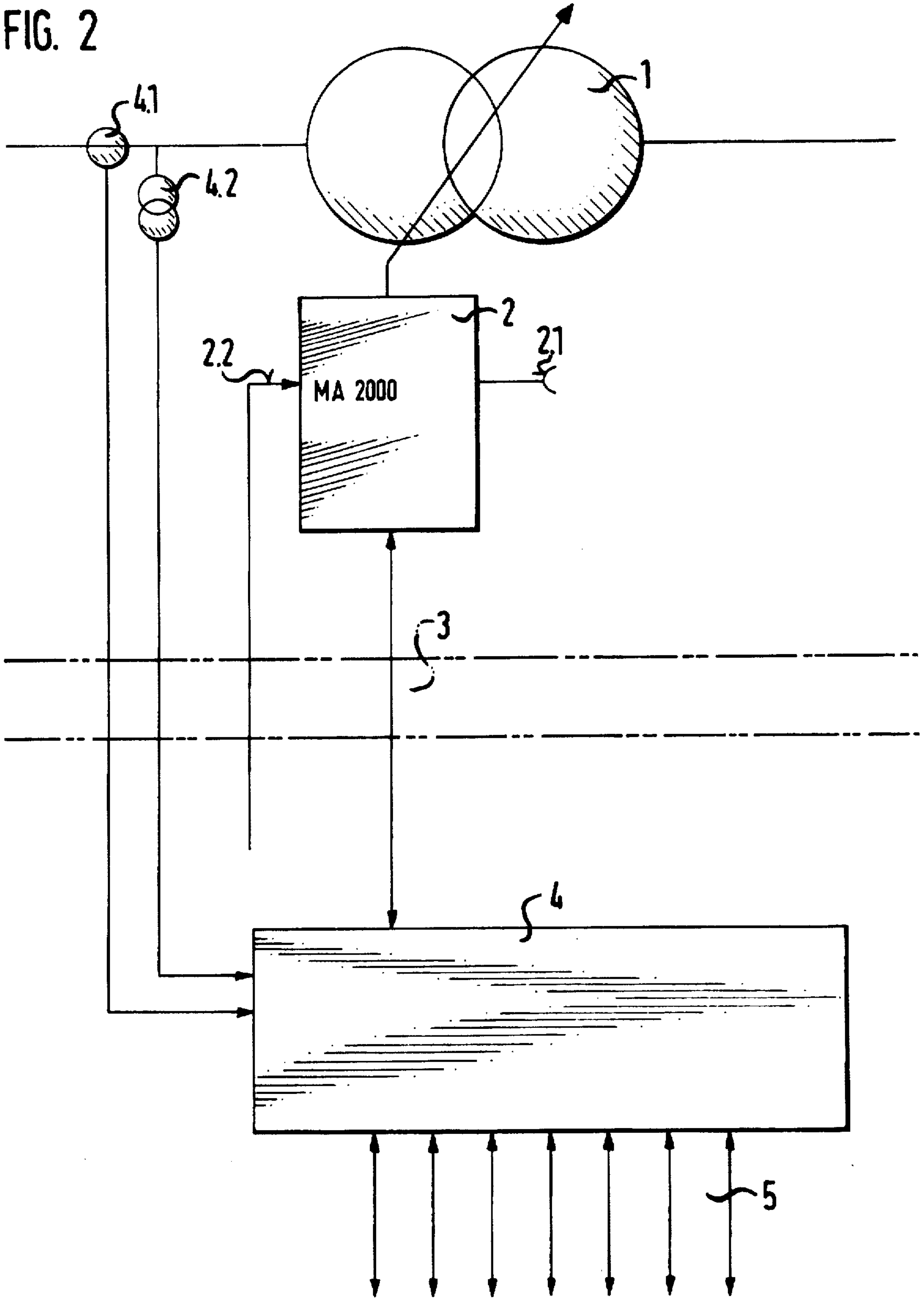
FIG. 2 an also schematic representation of a motor-driven step switch according to the invention also in connection with a controller.

In contrast FIG. 2 shows the motor-driven step switch according to the invention in the same circuit, the same elements being given the same references as in FIG. 1. As described in more detail below, the means in the motor drive 2, namely the means for determining the absolute value of the actual position of the step switch, the means for determining the actual position of the step switch in a range of step positions, and the means for detecting the end position of the step switch, produce information that is acted on by the controller and transmitted via a single serial transmission path 3. The commands formed in the controller 4 with the help of this information as well as the information from the current and voltage sensors 4.1 and 4.2 are also fed back via this transmission path 3 to the motor drive 2 so that in addition to the standard power-supply line 2.2 only a single data line serves for connecting the controller 4 and the motor drive 2 together.

The motor drive 2 has in addition a further serial interface 2.1 whose function is described below.

Figure 3:
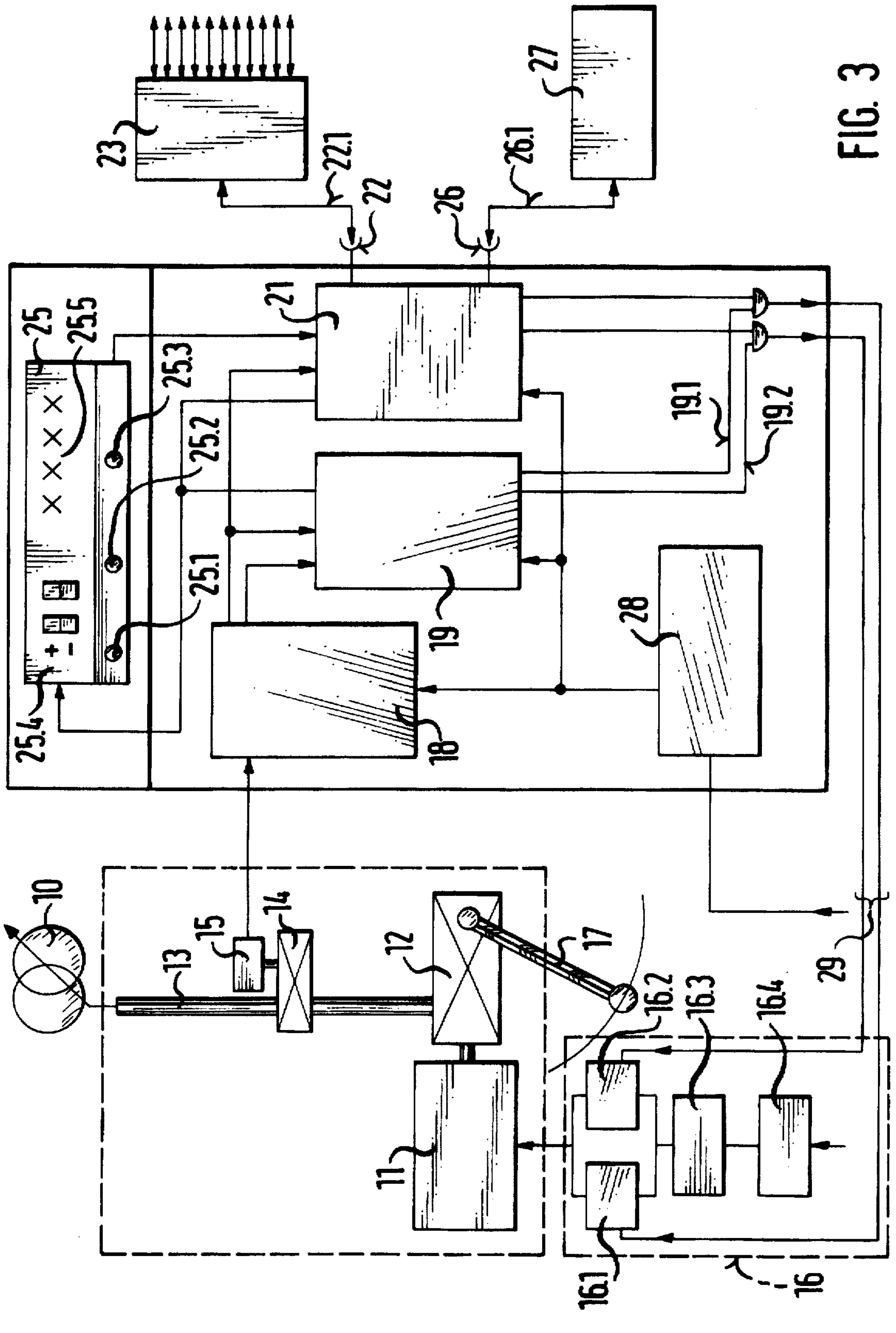
FIG. 3 the motor drive of the step switch according to the invention with its individual elements.

FIG. 3 shows the motor drive of a step switch according to the invention in greater detail. This drawing, where new references are applied, shows how drive motor 11 acts via a transmission 12 having an output shaft 13 on the step switch of the step transformer 10.

The drive motor 11 is connected with a controller 16 which for example acts as a switch controller with a "lower" switch 16.1, a "higher" switch 16.2, a motor protector 16.3 connected ahead of them, as well as a crank switch 16.4 for a hand crank 17.

An additional transmission 14 is connected to the drive shaft 13 which converts the maximum movement of the drive shaft 13 between the end positions of the step switch into a rotation of 360° which is detected by a position detector 15, e.g. a resolver, a potentiometer, or an optical sensor as an absolute value and is fed to an evaluating unit 18. The evaluating unit 18 converts the absolute sensor output, inasmuch as this is necessary depending on the type of sensor used, into a binary value which can be acted on by the hardware decoder 19 as well as by the micro controller unit 21.

The hardware decoder 19 has a logic programmable for the corresponding type of circuit. Thus independently of the micro controller unit 21 the step position can be shown in a console 25. The hardware decoder 19 operates redundantly, that is it determines by evaluating additional sensor contacts that the step switch has not moved beyond its switching region, i.e. its end positions. Corresponding output lines 29 lead to the controller 16.

The micro controller unit 21 continuously monitors via the position sensor 15 the movement of the drive shaft 13. All data relevant to operation are stored in a nonvolatile memory. All influences relative to the step-switch monitoring which could damage the step switch are registered and summed. For step-switch replacement a diagnosis line 26 can serve for reading out the to-date use of the switch to a diagnosing device 27.

The display and entry console 25 can read out the step position of the switch. Lamps show conditions relevant to operation as for example the actual position of the step switch inside a range and the end positions. This element has further keys for manually raising or lowering the switch as well as a switch for type of operation (local/remote).

The micro controller unit 21 has two serial interfaces. The bidirectional serial interface 22 is for communicating with a voltage regulator 23 known per se. All the motor information and data are transmitted to the voltage regulator 23 and can be transmitted thereby, when necessary, in conventional parallel form. Similarly data such as for example the termination of a motor-drive disturbance are registered by the voltage regulator 23 and transmitted further to the motor drive.

The voltage regulator 23 maintains in the known manner the actual voltage of line by controlling the step switch via the motor drive within preset limits of the set-point voltage level. The necessary commands are transmitted over the serial data line 22.1. To monitor the step switch by the micro controller unit 21, in addition the transformer current is checked at each switching step.

Information about the monitoring of the circuit and the archived data about the last hours before a disturbance can be read out on the diagnosis connection 26 by means of a diagnosing device 27, e.g. a lap-top computer.

We claim:

1. A motor-driven step switch for step transformers which includes a drive motor connected to the step switch, display means, input means, control means, a controller for actuating the drive unit in accordance with rotation direction, an information unit which obtains and transmits the step position and which is connected with the controller which delivers commands for controlling the drive motor and a switching operation, and an electrical connection between the controller and the display means, input means, and control means wherein the information unit has a sensor for determining the absolute value of the actual position of the step switch, nonvolatile memory means for storing the position of the step switches with a range of step positions, means for determining an end position of the step switch, programmable means for storing specific data about the step switches to be actuated, electronic means for converting the stored data into serial form, and electronic means for controlling and monitoring the switching operation, the electrical connection with the controller and the display, input, and control means being formed by a single serial data line.

2. The step switch according to claim 1 wherein the information unit has an additional serial interface for reading out the stored information about the motor drive.

3. The step switch according to claim 2 wherein means are provided for digitally displaying the step position along with additional means for manually operating the controller.

4. The step switch according to claim 3 wherein the drive motor and the sensors are separate from the standard motor drive and are mounted directly on the top of the step switch.

5. The step switch according to claim 4 wherein the sensor is connected via a transmission with the drive motor, the transmission converting the maximum movement of the step switch between its end positions into a rotation of 360°.

6. The step switch according to claim 5 wherein the electronic means for the serial encoding of the stored data is comprised of an evaluating circuit which recognizes and digitizes the absolute position value received from the sensor, a circuit for redundant hardware evaluation of the various positions of the step switch, and a micro controller with nonvolatile memory which is connected with the serial data line to the controller.

7. The step switch according to claim 6 wherein the motor drive has additional means for retrievably archiving the data stored in the information unit for a predetermined period.

8. The step switch according to claim 7 wherein the single serial data line is a fiber-optical conductor.

9. The step switch according to claim 8 wherein the means for determining the end position of the absolute value produced by the sensor of the actual position of the step switch is compared with respective stored specific switch data.

10. The step switch according to claim 9 wherein known signalling contacts on the motor drive and on the step switch provide an additional redundant end-position recognition.

11. The step switch according to claim 7 wherein the additional means for retrievably archiving is continuously overwritten.

12. The step switch according to claim 11 wherein the additional means for retrievable archiving the stored data is condensed after a predetermined time and reworked to secondary data.

* * * * *